(12) United States Patent
Sánchez Peiro

(10) Patent No.: US 6,836,726 B2
(45) Date of Patent: Dec. 28, 2004

(54) SATELLITE AND TERRESTRIAL REMOTE MONITORING SYSTEM FOR WIRELESS HANDHELD MOBILE TERMINALS

(75) Inventor: Juan Carlos Sánchez Peiro, Madrid (ES)

(73) Assignee: Integrasys, S.A., Madrid (ES)

( * ) Notice: Subject to any disclaimer, the term of this patent is extended or adjusted under 35 U.S.C. 154(b) by 0 days.

(21) Appl. No.: 10/408,710

(22) Filed: Apr. 7, 2003

(65) Prior Publication Data

US 2004/0068365 A1 Apr. 8, 2004

(30) Foreign Application Priority Data

| Oct. 4, 2002 | (ES) | 200202280 |
| Mar. 28, 2003 | (ES) | 200300739 |

(51) Int. Cl.[7] .............................................. G01S 13/74
(52) U.S. Cl. .................. 701/207; 455/456.1; 455/67.3; 340/686.1; 700/214
(58) Field of Search ........................ 455/414.1, 415, 455/427, 422.1, 456.1, 67.4, 67.3; 370/310, 330, 316; 342/357.09; 701/207; 700/214; 340/686.1

(56) References Cited

U.S. PATENT DOCUMENTS

| 5,577,067 | A | | 11/1996 | Zimmerman | 375/224 |
| 6,296,205 | B1 | * | 10/2001 | Hanson et al. | 244/158 R |
| 6,362,772 | B1 | * | 3/2002 | Skotch et al. | 342/42 |
| 2002/0059375 | A1 | * | 5/2002 | Pivowar et al. | 709/204 |
| 2002/0087266 | A1 | * | 7/2002 | Sugimoto et al. | 701/207 |
| 2002/0101374 | A1 | * | 8/2002 | Mutoh et al. | 342/357.09 |
| 2002/0118118 | A1 | * | 8/2002 | Myllymaki et al. | 340/686.1 |
| 2002/0165006 | A1 | * | 11/2002 | Haller et al. | 455/556 |
| 2002/0190898 | A1 | * | 12/2002 | Abraham et al. | 342/357.09 |
| 2003/0055590 | A1 | * | 3/2003 | Park et al. | 702/107 |
| 2003/0058810 | A1 | * | 3/2003 | Petronic | 370/316 |
| 2003/0157895 | A1 | * | 8/2003 | Agrawal et al. | 455/67.1 |

OTHER PUBLICATIONS

Kadowaki Susumu, Line Setting System for Mobile Satellite Communication Earth Station, No. 05–022204, Jan. 29, 1993 (Patent Abstracts of Japan), NEC Corp.

* cited by examiner

*Primary Examiner*—Thomas G. Black
*Assistant Examiner*—Tuan C To
(74) *Attorney, Agent, or Firm*—Klauber & Jackson

(57) ABSTRACT

A system and method to allow the control and command of a measurement instrument from a remote wireless handheld mobile terminal for obtaining, dynamically, the trace information, in the frequency and time domains, that represents satellite and terrestrial signals by means of a wireless communication with a server, in such a way that measurements and trace information taken by the measurement instrument are shown in real-time on a remote wireless handheld mobile terminal graphics screen. In particular, the invention provides the means for performing remote line-ups on up-linked satellite carriers, including the cross-polarization isolation measurements, from remote wireless handheld mobile terminals such as cellular phones or handheld computers (PDA) equipped with a wireless communication transceiver such as a cellular telephone or Wi-Fi (IEEE-802.11). The invention also provides concurrent access to a common single measurement instrumentation shared, transparently, by multiple remote wireless handheld mobile terminal users for performing simultaneous and independent alignment operations on up-linked satellite carriers without coordination with the satellite control center or hub station personnel.

15 Claims, 7 Drawing Sheets

Figure 1:
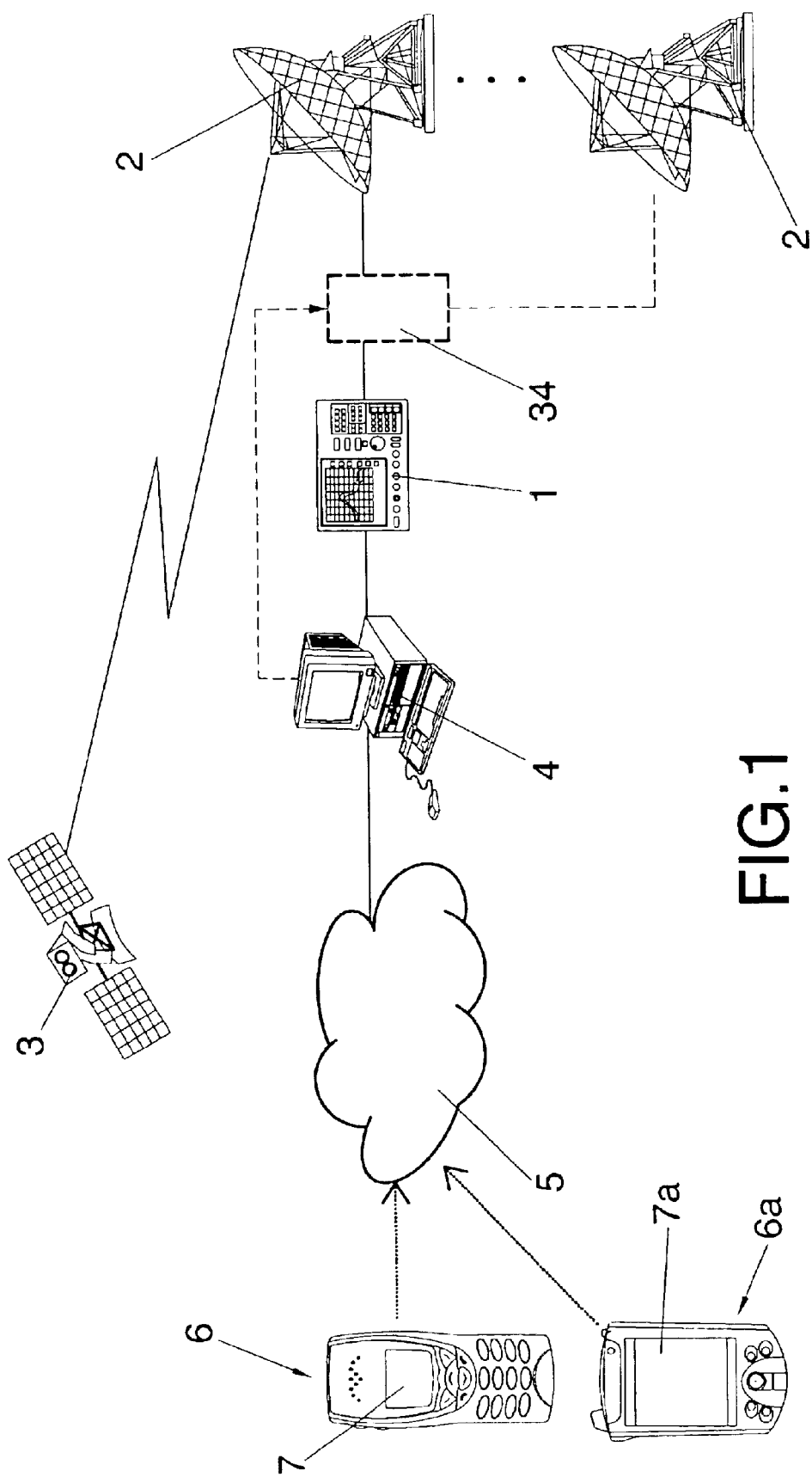

SATELLITE AND TERRESTRIAL REMOTE MONITORING SYSTEM FOR WIRELESS HANDHELD MOBILE TERMINALS

BACKGROUND OF THE INVENTION

In the technical state it is known the document of U.S. Pat. No. 6,362,772 which describes a system and a method for providing remote viewing of satellite transponder plots, and which is connected to a spectrum analyzer that generates the referred plots. Also, comprises control equipment and a server connected to the spectrum analyzer and to an antenna, so local storage of plots is made in the server and through a remote connection, it is possible to access the server and view the stored plots. This system does not allow to obtain the plots evolution in real time, since the plot is stored as a photograph, and it is sent to the remote computers. Also, this system does not allow to command the operation of the measurement system to obtain measurement results and plots from a cellular phone terminal, but it requires a remote computer.

In the technical state also it is possible to mention the U.S. Pat. No. 5,577,067 which describes a data acquisition system from a portable spectrum analyzer connected to a telecommunication system. Data captured by the analyzer is transmitted by a telecommunication system to a slave receiver module which is accessible through any way of communication, such as for example cellular telephony, so maintenance and parameter update tasks are performed. This system requires the development of a particular slave receiver module that although it may use cellular telephony networks to communicate with the telecommunication equipment connected to the measuring equipment, it does not allow to display measurement results and plots on a wireless handheld mobile terminal.

Also, the document Japan Patent JP 502224 has been located; it refers to a system for performing the alignment of a transportable ground station for satellite communications, intended for reducing the time required by the transportable station operator to perform one test but, like the previous systems, it does not allow to display real-time information data traces on wireless handheld mobile terminals.

Therefore, in the technical state it is not known any system that allows the measurement control and trace display from one or more concurrent wireless handheld mobile terminals in real-time.

DETAILED DESCRIPTION

In order to achieve the objectives previously mentioned, the invention has developed a system that allows monitoring of terrestrial and satellite signals from one or more wireless handheld mobile terminals in real time by means of a server.

The invention system, like the systems described in the technical state, comprises one or more signal capture element for satellite, terrestrial, cable headends, etc which are connected to the measuring equipment that obtains traces representing signal parameters, like a spectrum analyzer. This measuring equipment is connected to the server which commands the measuring equipment to get and process the data parameters and traces obtained by the measuring equipment.

The innovation of this invention is that the server comprises a new framework that allows the communication with one or more wireless handheld mobile terminals so the server commands the measurement instrument to obtain measurement results and traces ordered from the wireless handheld mobile terminals. Also, a wireless handheld mobile terminal with graphics display includes a new framework that allows commanding and controlling the measurement instrument through the server and, in order to achieve that functionality, it comprises:

- a control module to command, from the wireless handheld mobile terminal, the measurement instrument in order to obtain measurement results and traces through the server and also to control the reception of measurement data and traces, obtained by the measurement instrument, at the wireless handheld mobile terminal.
- a command editing and control module for the selective edition of commands and its transmission to the measurement instrument through the server.
- a graphics module for displaying in real time on the wireless handheld mobile terminal graphics screen the measurements results and traces obtained.

The new configuration for the server is determined by incorporating:

- a wireless communication control module for communicating with the wireless handheld mobile terminals and comprising a multitasking sub-module for providing concurrent access to multiple simultaneous users.
- a storage module which includes a user identification and authentication sub-module to perform the access validation, once the communication has been established, allowing the access to the measurement instrumentation.
- an instrumentation command control module for managing the commands sent by the wireless handheld mobile terminal to command the measurement instrumentation, allowing its control, and comprising a shared instrumentation coordination sub-module to share the measurement instrumentation transparently among multiple wireless handheld mobile terminal users in real-time.
- A data base which stores that data that allows to remotely control the measurement instrumentation from the wireless handheld mobile terminals.

This configuration allows the representation in real time of trace information and measurement results obtained by the measurement instrumentation on the remote wireless handheld mobile terminal, which represents a significant advantage; and, in a way that the system can be connected to any kind and model of computer controllable measurement instrumentation.

Another advantage introduced by the invented system consists in providing simultaneous communication capabilities with the server to multiple wireless handheld mobile terminals; to achieve this function, the server wireless communication control module includes a multitasking control sub-module and the server instrumentation command control module, for controlling the commands sent by the wireless handheld mobile terminal, comprises a shared instrumentation coordination sub-module to share the measurement instrumentation transparently among multiple wireless handheld mobile terminal users in real-time.

Also, the server storage module includes a measurement system operation save & recall set-up sub-module which manages pre-defined measurement parameter value setups and the wireless handheld mobile terminal comprises a measurement set-up edit, save and recall module.

The communication between the wireless handheld mobile terminal and the server employs TCP/IP and HTTP protocols, very popular and well known in the data communications world.

One implementation of the invention is built on a cellular phone terminal with graphics display; besides the modules already mentioned, it comprises a dial-up connection module for establishing the call to communicate the cellular phone terminal with the server, and a math processor to format and display the raw measurement results and trace information received. Also, it is possible to have the cellular phone terminal integrated in a laptop or pocket computer and display measurement results and traces in real time on its screen.

The communication between the cellular phone terminal and the server can be made using the fixed telephone network by connecting the server to that telephone network and establishing the communication with the cellular terminal in a conventional way using the mentioned protocols.

In other implementation of the invention, the wireless handheld mobile terminal is a pocket computer with an integrated wireless local area network (LAN) transceiver, also known as Wi-Fi (IEEE-802.11 standard), as an example of implementation on a pocket computer (Pocket PC) or PDA (Personal Device Assistant) handheld computer.

The handheld or pocket computer used by the invention, in addition to the standard framework used, it exhibits a system initialization and management module, connected using the handheld computer provided means, to command the measurement instrumentation in order to take measurements and obtain traces, and to receive those measurements and traces obtained by the measurement instrumentation.

The measurement system set-up save & recall module in the handheld computer is connected to the handheld computer non-volatile memory. In this way, it is possible to save different measurement instrumentation set-ups (measurement configurations) and, afterwards, recall any pre-saved set-up and send it to the measurement system through the server to configure the measurement system with that selected operating set-up. The invention considers that the measurement system set-up save & recall module comprises a measurement trace limit mask sub-module to graphically indicate where and when the measurement results (traces) are above and/or below the defined upper and lower measurement limits to detect possible failures, events, etc. Also, the handheld computer non-volatile memory contains, by default, the instrumentation preset set-up.

Measurement mask limits define an upper and a lower limit, establishing a gap or margin; also, it is possible to define relative upper and lower limits taking any single point of the measured trace as a reference.

The graphics module, for displaying on the handheld computer screen the traces obtained from the measurement instrumentation, is connected to the handheld computer non-volatile memory to store different traces obtained by the measurement instrumentation and record the spectrum activity during a given time period; also, this graphics module comprises a processing sub-module to process and display in real-time several traces simultaneously, like the case of a cross-polarization isolation measurement graphics representation, for example, where two signals from two different polarizations are displayed simultaneously. Also, the graphics module comprises a sub-module to zoom-in the represented traces and other sub-module to display in real time the maximum hold and minimum hold traces during a given time period.

The command editing and control module in the handheld computer facilitates the selective edition of commands that are sent to the measurement instrument through the server. Also, it is possible to send a measurement instrumentation set-up to make one or several measurements, as it was described previously.

The command editing and control module in the handheld computer comprises a frequency sub-module to set the frequency parameters at the measurement instrument (start, stop, center, span, offset)

a markers sub-module to position and display markers at the displayed trace(s) and its associated measurement readouts: frequency and amplitude.

a filters sub-module to select different video and resolution filter bandwidths at the measurement instrumentation, specify the trace average factor and the sweep time parameter.

an amplitude sub-module to set the amplitude parameters at the measurement instrument (reference level, scale, input attenuation)

a display selection sub-module to establish a selection of different traces to be displayed on the handheld computer screen.

a measurement sub-module to specify one or multiple measurements (signal center frequency, amplitude, bandwidth, power, C/N ratio, cross-pol isolation) on the displayed trace at the handheld computer screen.

a measurement parameter sub-module to specify or select the measurement parameter value to be used by processing algorithms applied to raw measurements readings in order to compute elaborated results of previously mentioned measurements.

The frequency sub-module includes a block for selection or value definition for each of the measurement instrumentation (signal or spectrum analyzer) following frequency parameters:

center frequency, frequency span, start frequency, stop frequency and center frequency offset.

The markers sub-module includes:

a block with marker search functions to position the markers at the maximum or minimum amplitude point in a given trace being displayed on the handheld computer screen.

a block to set the analyzer's center frequency to the frequency value indicated by the marker readout.

a block to set the analyzer's amplitude reference level to the amplitude value indicated by the marker readout.

a block to indicate the frequency and amplitude difference between two markers readouts (delta marker)

The amplitude sub-module includes a block for selection or value definition for each of the measurement instrumentation (signal or spectrum analyzer) following amplitude parameters:

reference level, amplitude scale, and input attenuation.

The filters sub-module includes a block for selection or value definition for each of the measurement instrumentation (signal or spectrum analyzer) following filtering parameters:

video filter bandwidth, and resolution or IF filter bandwidth.

Also, it includes blocks for selection or value definition of the measurement instrumentation (signal or spectrum analyzer) frequency sweep time and trace averaging factor.

The measurement sub-module to specify one or multiple measurements (signal center frequency, amplitude, bandwidth, power, C/N ratio, cross-pol isolation) on the displayed trace at the handheld computer screen includes:

a block to selectively command the execution of each measurement in a single or continuous way.

The measurement parameter sub-module used to specify or select the measurement parameter values to be used by processing algorithms applied to raw measurements readings in order to compute elaborated results of previously mentioned measurements includes:

signal modulation format selection:analog or digital, used for computation of the power measurement, reference frequency bandwidth for the normalization of the noise measurement result used in the calculation of the C/N ratio measurement, signal center frequency offset to perform the noise measurement used in the calculation of the C/N ratio measurement, amplitude offset in dB from maximum amplitude point of signal's trace to perform the signal bandwidth measurement, input switching position of the cross polarized signal to perform the cross-polarization isolation measurement.

The display selection sub-module used to establish a selection of different traces to be displayed on the handheld computer screen also includes:

a block for defining the storage place in the handheld computer memory for measurement traces, a block for editing the measurement results with an external standard word processor, a block for printing the measurement results and traces on a printer connected to the handheld computer.

Another innovation introduced by the invention consists in including a solid-state or electromechanical switching matrix (between multiple possible signal capture elements and the measurement instrumentation) and its control mechanisms, allowing the selection of a particular input signal for performing its measurements from the remote wireless handheld computer. In this way, the handheld computer remotely commands the input switching matrix to automate the cross-polarization isolation measurements by alternating, in an instrument sweep synchronized way, the input switching selection at the matrix between two orthogonal polarized input signals (i.e. vertical and horizontal polarized signals).

To better illustrate and explain this description, following a set of diagrams representing the invention is shown, as an integrating part of this document, intended for illustrative, but not limiting, purposes.

BRIEF DESCRPTION OF DRAWINGS

FIG. 1.—This figure shows a block diagram of the invention and, conceptually, how satellite signals parameters are measured and trace information is obtained.

Figure 2:
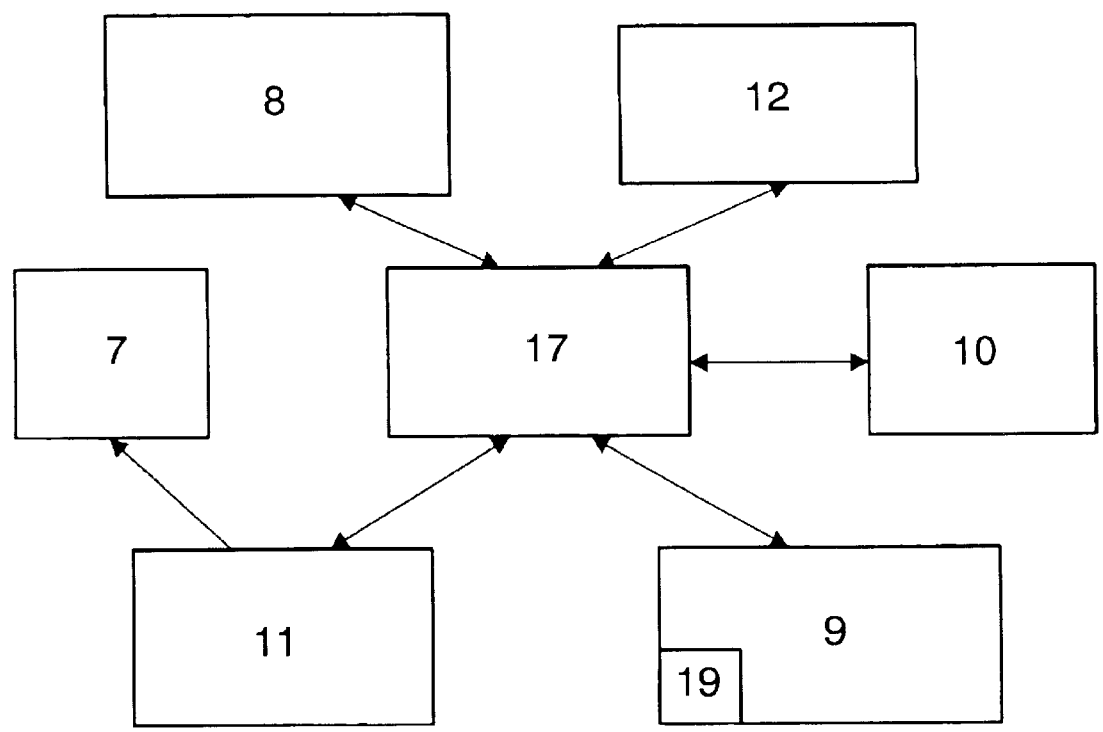

FIG. 2.—This figure shows a functional block diagram of the modules to be added to a cellular phone terminal to get from it the capability for the management of signal measurement and data acquisition at the measurement instrumentation.

Figure 3:
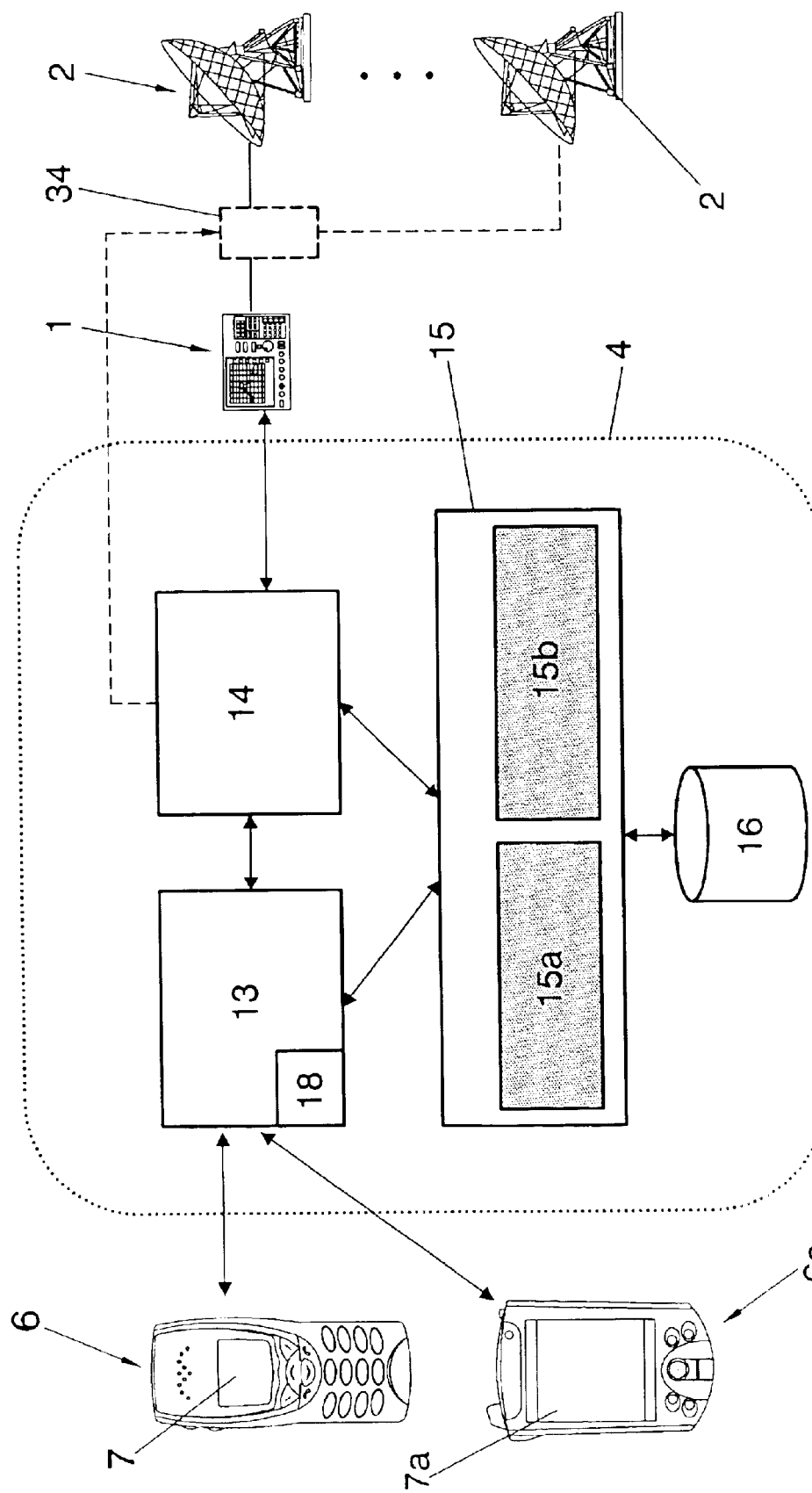

FIG. 3.—This figure shows a functional block diagram of a possible implementation example of this invention server.

Figure 4:
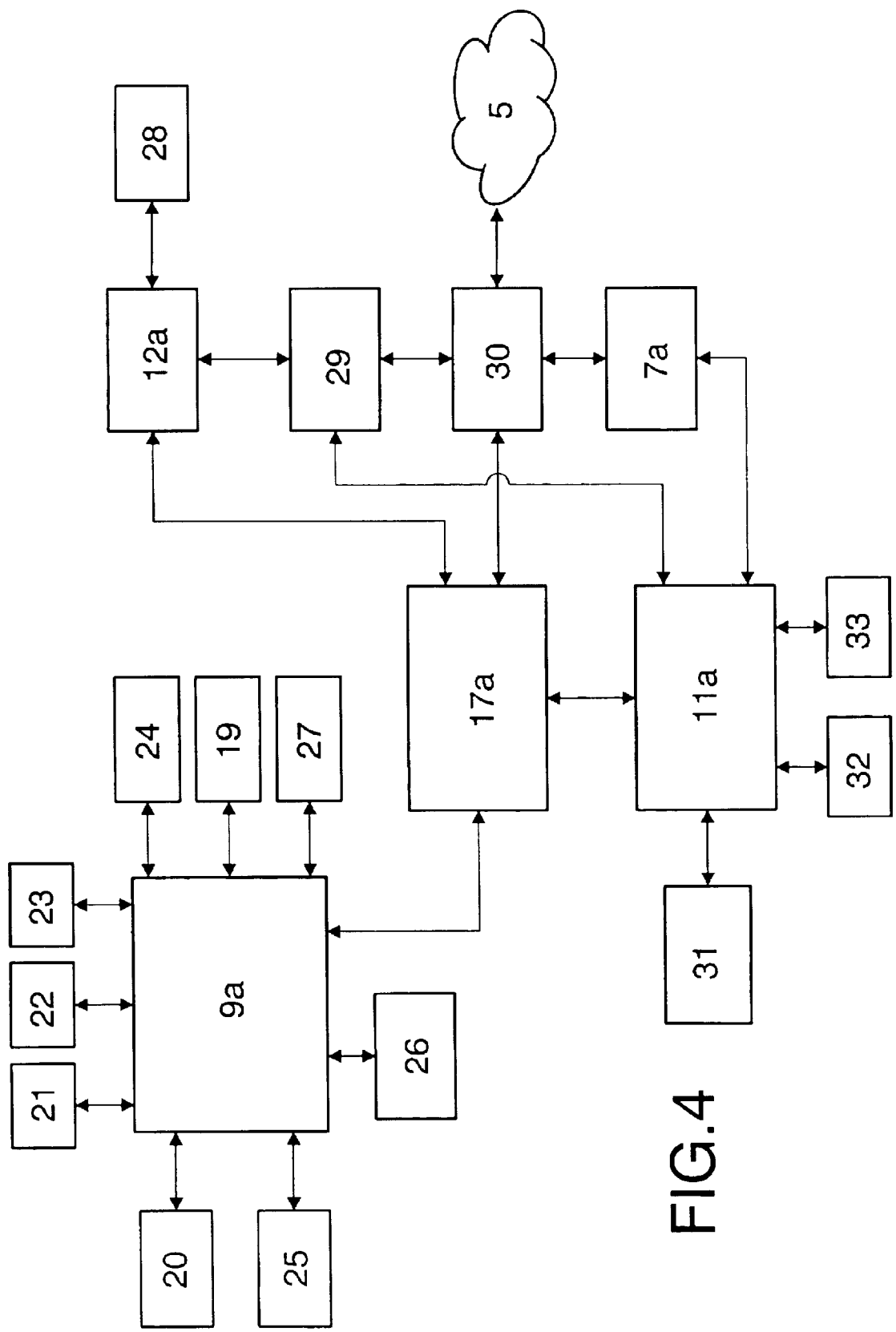

FIG. 4.—This figure shows a functional block diagram of the framework added to a conventional handheld computer and its connection to the conventional modules of a that handheld computer to get from it the management capability of signal measurement and data acquisition at the measurement instrumentation.

Figure 5:
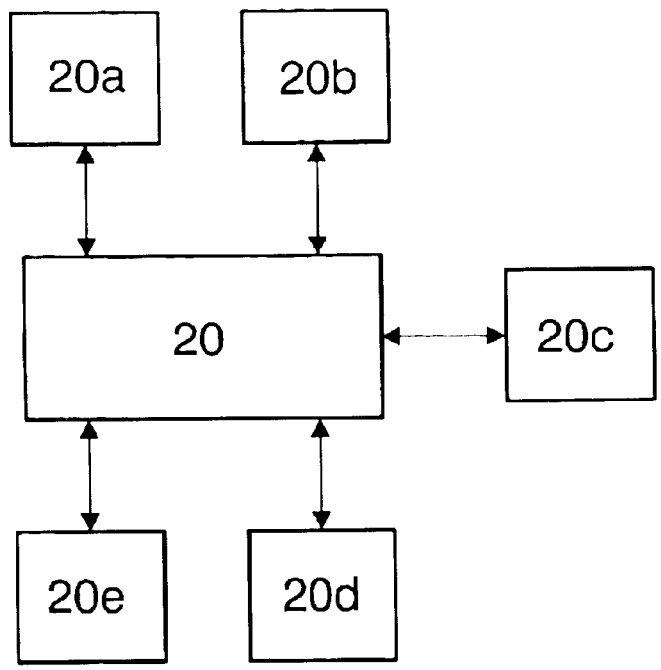

FIG. 5.—This figure shows a functional block diagram of a possible implementation example of the frequency sub-module included in the command editing and control module of the handheld computer.

Figure 6:
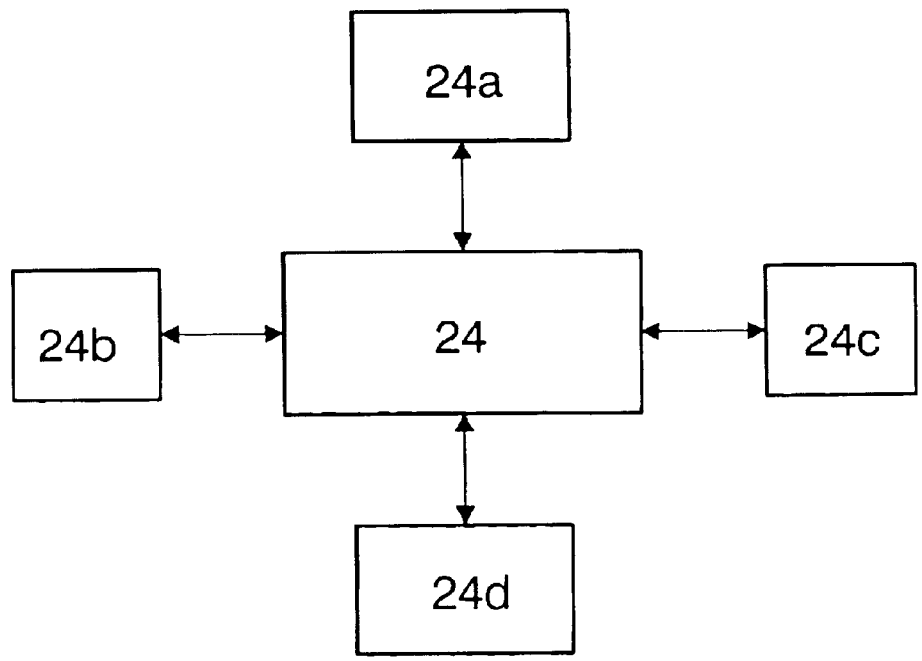

FIG. 6.—This figure shows a functional block diagram of the markers sub-module included in the command editing and control module of the handheld computer.

Figure 7:
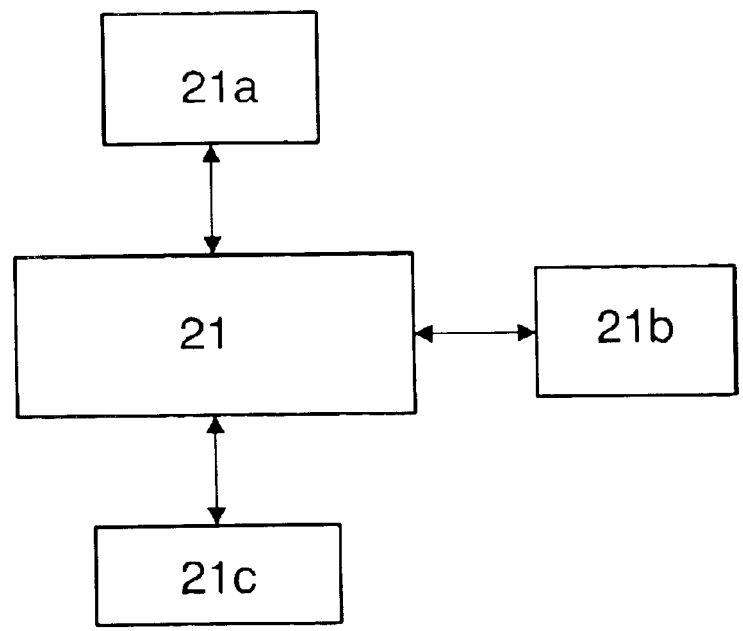

FIG. 7.—This figure shows a functional block diagram of the amplitude sub-module included in the command editing and control module of the handheld computer.

Figure 8:
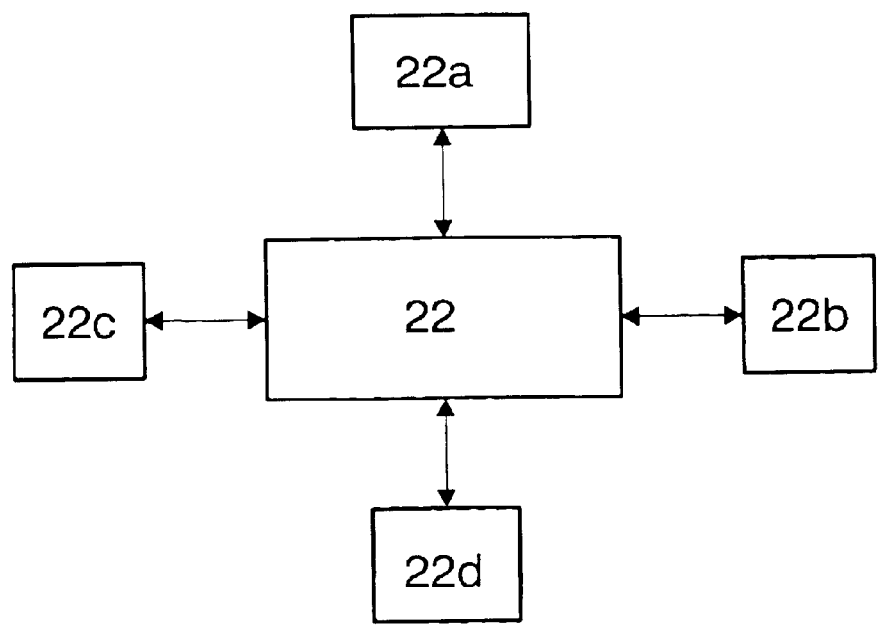

FIG. 8.—This figure shows a functional block diagram of the filters sub-module included in the command editing and control module of the handheld computer.

Figure 9:
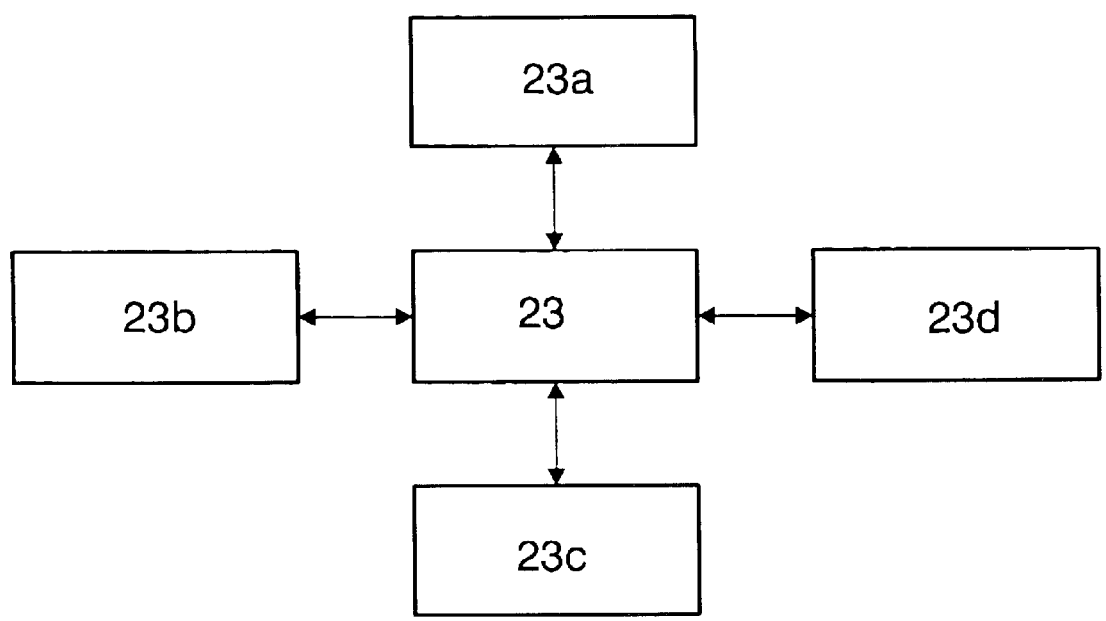

FIG. 9.—This figure shows a functional block diagram of the display selection sub-module included in the command editing and control module of the handheld computer.

DESCRIPTION OF THE PREFERRED IMPLEMENTATION

Following a description of the invention based on the a fore mentioned figures.

In the FIG. 1 an example of the implementation is shown where a measurement instrumentation (1) connected to at least one antenna (2) captures the signals transmitted by a satellite (3). Obviously we are quoting the satellite example, but the invention should be applied to obtain remotely the measurements and traces of terrestrial signals, cable headers parameters, etc., through the connection of a measurement instrumentation in the location where the measurements need to be done.

The measurement instrumentation (1) is formed by conventional signal measurement analyzers, such as Spectrum Analyzers, Vector Analyzers, etc, that receive the signals from the Antenna (2), in order to perform measurements in a conventional way.

The measurement instrumentation (1) is controlled by a server (4) that at the same time through a network (5) communicates with one or more wireless handheld mobile terminals, that in one of the implementation examples is a cellular phone (6) with graphics display (7) and in the other implementation example is a handheld computer (6a) (PDA or Pocket PC) with an integrated wireless cellular or Wi-Fi transceiver.

The communication between the server (4) and the wireless handheld mobile terminals (6,6a) is done through TCP/IP and HTTP, already well known protocols, and all of it through a communication network (5), that can be public network or Internet.

This new architecture allows to control and command the measurement instrumentation (I) from the wireless handheld mobile terminals (6, 6a) in real-time, as it is described bellow.

To start, we will describe the implementation example of the wireless handheld mobile terminal being a Cellular Phone (6).

For that purpose the wireless handheld mobile terminal (6), on top of the its conventional structure, includes a Control Module (17) that is connected to a Dial-Up Connection Module (8), a Command Editing & Control Module (9), a Math Processor Module (10), a Graphics Module (11) and a Measurement Set-up (Configurations) Editing, Save & Recall Module (12).

In order to establish the communication with the wireless handheld mobile terminals, the server (4), has a Wireless Communication Control Module (13), an Instrumentation Command Control Module (14), a Storage Module (15) and a Database (16). The Storage Module (15) also has a User Authentication & Identification sub-module (15a) and a Measurement System Operation Save & Recall Set-up sub-module (15b).

Following there is a description of how this architecture works:

On the basis of the mentioned description, it is understood that when a user wishes to control the measurement and obtain real-time traces from the measurement instrumentation (1) through a wireless handheld mobile terminal (6), the user will request it through the wireless handheld mobile terminal (6) keyboard; the instruction is then detected by the Control Module (17) that coordinates the operation of the different modules, initializing all the subsystems within the system, and communicating them during the execution period; for that purpose the Dial-up Connection Module (8) is activated and initiates the call to the server (4), the protocols to be used and the error control, in the case that errors occur.

The call is received by the Wireless Communication Control Module (13) of the server (4) that access the Storage Module (15) and more precisely the User Authentication and Identification sub-module (15a) to perform authentication of the user.

Once the user has been authenticated, he access the Measurement System Operation Save & Recall Set-up sub-module (15b) and allows the access from the handheld mobile terminal (6) to the measurement instrumentation (1).

Then, the user selects the operations to be done through the handheld mobile terminal (6) keyboard, through the Command Editing & Control Module (9), to request the measurement instrument to perform the different functions through the server (4), that through its Wireless Communications Module (13) gives the commands to the Instrumentation Command Control Module (14), from which the server (4) commands the functionality of the measurement instrumentation (1). The measurement instrumentation (1) obtains all the measurements and traces requested, and sends them to the Instrumentation Command Control Module (14), that through the Wireless Communication Control Module (13) are sent to the Control Module (17) of the handheld mobile terminal (6). The handheld mobile terminal (6) through the Math Process Module (10) obtains the parameters measured value, and through the Graphic Module (11) processes the traces obtained, representing in the display (7) of the handheld mobile terminal (6) the different measurement and traces.

All this process is synchronized by the Control Module (17).

The Command Editing & Control Module (9) gives user access to the commands input/edition so that they are remotely performed by the Instrumentation Command Control Module (14) of the server (4), so that it can command the functionality of the measurement instrumentation as it has been explained previously.

The Measurement Set-up (Configurations) Editing, Save & Recall Module (12) allows the storage, recovery and command of predefined setups, allowing to set up the measurement instrumentation (1) in a predefined configuration immediately. This module (12) can store and/or retrieve the working parameter values in the wireless handheld mobile terminal (6) non-volatile memory elaborating the data structure to be transferred to the measurement instrumentation (1) and making the simplifications and improvements needed to optimize the transfers and the respond times.

The measurement process is maintained while the user requests it.

In this Preferred Implementation of the invention, also, the alternative of the cellular terminal being included in a handheld computer is covered, so that it allows to operate the remote measurement instrumentation (1) in the same way it has been described for the cellular phone (6), with the difference that, in this case, the cellular terminal (6), does not need of a graphic display (7), because the handheld computer screen (7a) is used for the purpose of displaying the values of the parameters and traces measured.

In this case, the connection between the measurement instrumentation (1) and the antenna (2) is made by a switching matrix (34) that is connected to one or multiple antennas (2) that receive signals from different satellites (3), to select any signal coming from any antenna, and, in particular, the horizontal or vertical polarized signals coming from one of the antennas (2), as it is described bellow.

The measurement instrumentation (1) is controlled by a handheld computer (6a), as for instance could be a handheld computer PDA (Personal Device Assistant) with touch-screen graphical display (7a) or a pocket computer, for which this presents a new configuration that allows this functionality. The control of the measurement instrumentation (1) by the handheld computer (6a) is done through a server (4) that communicates with the handheld computer (6a) through a communication network (5). We must point out that the command of the switching matrix (34) is also done through the handheld computer (6a) and through the server (4).

A wireless communication control module (30) is used in handheld computer (6a) to allow the wireless communication of the handheld computer (6a) with the server (4). This module (30) is capable of controlling the communication using either a cellular terminal incorporated to the handheld computer or an integrated wireless local area network (WLAN) transceiver, also named (WI-FI), implemented through the standard IEEE-802.11, as they are conventionally available in the market.

The communication between the server (4) and the handheld computer (6a) is made through TCP/IP and HTTP conventional protocols.

The communication network (5) can be the Public Network or the Internet Network.

To allow the control and command of the measuring instrumentation (1) through the handheld computer (6a), it presents a new architecture, as it is described bellow.

The handheld computer (6a), on top of the its conventional structure, includes a control module (17a) that is connected to the wireless communication control (30) of the handheld computer to command the server (4) and obtain, through it, the measurements results and the traces (plots) from the measurement instrumentation (1) in real-time.

For that purpose, the control module (17a) is connected to the Measurement Setup (Configurations) Editing, Save & Recall Module (12a) that is connected to the Non-Volatile Memory Module (29) of the handheld computer (6a) to store in it different configuration setups of the instrumentation (1). This module (12a), through synchronous and coordinated transactions with the control module (17a), allows to save, retrieve, and delete the configurations stored in the Non- Volatile Memory Module (29), sending the configurations through the control module (17a), the wireless communication control (30) and the network (5), to the server (4) which commands the selected configurations of the measurement instrumentation (1), as it will be described thereafter.

The measurement configuration set-up recall concept allows, with one single command, to make multiple remote control operations on the measurement instrumentation to configure on it multiple operating parameters with values previously saved in a given configuration set-up. The communication with the server (4) is made through synchronous and coordinated operations managed by the control module (17a).

On top of the Measurement Set-up (Configurations) Editing, Save & Recall Module (12a) there is a Measurement Trace Limit Masks sub-module (28) to graphically indicate where and when the measurement results (traces) are above and/or below the defined upper and lower measurement limits to detect possible failures, events, etc. Also, it is important to point out that, within the stored instrumentation configuration set-ups, the preset state of the measurement instrumentation is also included by default, so when this preset configuration set-up is sent through the server (4), the measurement instrumentation (1) is re-initialized.

The high and low level can be defined by ranges or through points marked in the graph.

On top of that, the handheld computer has a Command Editing & Control Module (9a) that allows to perform the remote interaction and the measurements with the server (4) and, through it, with the measurement instrumentation (1). Therefore the Command Editing & Control Module (9a) has a frequency sub-module (20) to define values to the frequency related parameters in the measurement instrumentation. As a result of that, the frequency sub-module (20) includes a block for selection or value definition for each of the measurement instrumentation (signal or spectrum analyzer) following frequency parameters:

center frequency (20a)

start frequency (20b)

stop frequency (20c)

center frequency offset (20d) and frequency span (20e)

Another possibility that presents the Command Editing & Control Module (9a) is to allow to mark positions in the obtained traces. For that purpose, the Command Editing & Control Module (9a) has a Marker sub-module (24) that allows to perform the above mentioned functions. It includes:

a block with marker search functions to position the markers at the Maximum or Minimum amplitude point in a given trace being displayed on the handheld computer screen (24a)

a block to set the analyzer's Center Frequency to the frequency value indicated by the Marker readout (24b)

a block to set the analyzer's amplitude Reference Level to the amplitude value indicated by the market readout (24c)

a block to indicate the frequency and amplitude difference between two markers readouts (24d) (Delta Marker).

The Amplitude sub-module (21) includes a block for selection or value definition for each of the measurement instrumentation (signal or spectrum analyzer) following amplitude parameters:an amplitude Reference Level selection block (21a), an amplitude Scale selection block (21b) and an input Attenuation selection block (21c), so each instrumentation amplitude setting is controlled by its associated block.

Another functionality of the Command Editing & Control Module (9a) consists in allowing the filter selection for the measurement instrumentation, for which that module (9a) has a filters sub-module (22) that comprises a Video Filter Bandwidth Selection block (22a), a Resolution or IF Filter Bandwidth Selection block (22b) and a Sweep Time Selection block (22c), so each block controls each associated instrument setting.

On top of that Filters sub-module (22) there is a Trace Averaging Factor Selection block (22d) to define the averaging factor of the signal traces obtained.

Another functionality of the Command Editing & Control Module (9a) is to allow the graphical selection of part of the traces (zoom-in) represented in the touch-screen of the handheld computer and manipulate the information displayed; it is accomplished through a Display Selection sub-module (23) that is composed by a Zoom-in Display Selection block (23a) allowing the selection a certain selected area in the touch-screen by pointing that area with the pencil on the touch-screen of the handheld computer. Also, the Display Selection sub-module (23) has a Results Storage block (23b), for storing the measurement result data and traces represented in the display in a user-selected path or directory, to be able to use them back again when needed. The Display Selection sub-module (23) also has a Results Edition block (23c) for editing the results presented in the display, according to different formats through external software, so for instance, this module can edit the display through a word processor such as Microsoft Word. The Display Selection sub-module (23) also allows printing the results appearing on the display on a printer connected to the handheld computer; to provide that functionality, it has a Results Print block (23d).

The Command Editing & Control Module (9a) also incorporates a Measurement Selection sub-module (25) to specify the execution in real-time of one or multiple measurements: signal center frequency, amplitude, bandwidth, power, C/N ratio and cross-polarization isolation, on the displayed trace at the handheld computer screen (7a), including a block to selectively command the execution of each measurement in a single or continuous way.

The Command Editing & Control Module (9a) comprises a Parameters Selection sub-module (26) used by the user to specify or select the measurement parameter values to be used by processing algorithms applied to raw measurements readings in order to compute elaborated results of previously mentioned measurements. It includes:

signal modulation format selection: analog or digital, used for computation of the power measurement, reference frequency bandwidth for the normalization of the noise measurement result used in the calculation of the C/N ratio measurement, signal center frequency offset to perform the noise measurement used in the calculation of the C/N ratio measurement, amplitude offset in dB from maximum amplitude point of signal's trace to perform the signal bandwidth measurement, input switching position of the cross polarized signal to perform the cross-polarization isolation measurement.

As previously mentioned, the user, from its handheld computer, is allowed to control a solid-state or electromechanical switching matrix (34), through the server (4), allowing the selection of a particular input signal. For that purpose the Command Editing & Control Module (9) comprises a Switching sub-module (27) to select one of the input switching matrix positions (34) in order to receive any signal coming from any of the antennas (2) and perform the requested measurements, already mentioned, on the selected input signal. In particular, the handheld computer remotely commands the input switching selection (34) to automate the cross-polarization isolation measurements by alternating, continuously and in an instrument sweep synchronized way, the input switching selection at the matrix between two orthogonal polarized input signals, offering real-time two-trace display adjustment capabilities.

In order to manage and display the different traces, the handheld computer (6a) has a Graphics Module (11a) that displays on the handheld computer screen the traces obtained from the measurement instrumentation (1) through the server (4). The Graphics Module (11a) is connected to the Non-Volatile Memory Module (29) of the handheld computer in order to store in real-time and continuously the different traces obtained from the measurement instrumentation during a certain period of time specified by the user.

The Graphics Module (11a) comprises a dual trace Cross-Polarization Representation Module (32) in order to store and display, in real time and continuously, two traces simultaneously. This module (32) is used by the cross-polarization isolation measurement, where two signals (traces) from two different polarizations are displayed simultaneously. The Cross-Polarization Representation Module (32) in connection with Module (29) also records, in real-time and continuously, the full dual trace spectral activity of selected orthogonal polarized signals during a certain period of time specified by the user.

Also, the Graphics Module (11a) includes a Zoom-in sub-module (33) of the represented traces, so that it reduces the frequency span analyzed and displayed according to the user selection. Finally, the Graphics Module (11a) has a Max-Hold & Min-Hold Representation sub-module (31) to display in real time the maximum hold and minimum hold traces during a given time period selected by the user.

The server (4) presents a configuration identical to the one described in the implementation example of the mobile phone (6), incorporating a Wireless Communication Control Module (13), an Instrumentation Command Control Module (14), a Storage Module (15), and a Database (16).

According to the description done until now, it is easily understood that when a user wishes to make a request to the measurement instrumentation through the keyboard or through the touch-screen Display (7a) of the handheld computer, the Control Module (17a) is activated and detects the need to establish the communication with the remote measurement instrumentation and, for that purpose, it initializes the rest of the modules of the handheld computer (6a) and coordinates them in order to perform the task defined by the user.

Once the remote session to control the instrumentation is established, the user will perform the remote operations on the measurement instrumentation through the Command Editing & Control Module (9a), that selects the proper module and sub-module for the operation requested by the user or, if the user wishes to recall a full instrumentation configuration set-up, he will access the Measurement Set-up (Configurations) Editing, Save & Recall Module (12a) and the selected set-up will be sent to the measurement instrumentation (1) to perform in a single step all the registered operations saved in the instrumentation set-up requested.

In each of these cases, the server commands the measurement instrumentation and, once the requested operations have been performed, they are returned to the handheld computer through the Control Module (17a), in such a way that the result of this operations is sent to the Graphic Module (11a) that processes them and represents them in the handheld computer (6a) display (7a) through each of the modules and in the functionality requested by the user. This way of operation ensures proper feedback to the user on the result of its control operations. The mathematical processing functions required for each of the operations are done by the modules that are conventionally included in the handheld computer (6a).

It is important to point out that the color capabilities provided by the handheld computer display (6a) are used to display a clear representation of the traces, so that several traces can be displayed simultaneously with different colors.

Since the Non-Volatile Memory Module (29) allows the continues storage of the data traces received in real-time by the handheld computer, it also includes with those data traces records the numerical values of date and time, hour, minute and second, of the received traces. This recording function is maintained during the time specified by the user so, at later time, using the Graphic Module (11a), the existing recordings are retrieved and re-played to be able to evaluate random events, alarms, values, or specific signal issues, and also send them via electronic mail to others.

When the server (4) receives a request from the handheld computer (6a), it access the Storage Module (15), and more precisely it access the User Authentication Module (15a) to perform the identification and authentication of the user to allow or deny the access from the handheld computer to the measurement instrumentation (1). After a positive authentication, the user access to the Measurement System Operation Save & Recall Set-up sub-module (15b) to gain access from the handheld computer to the measurement instrumentation (1). The user starts the operations in order to obtain on its handheld computer (6a) the requested measurements and data traces that are received from the server (4). The server (4), through its Wireless Communication Control Module (13), delivers the requests received from (6a) to the Instrumentation Command and Control Module (14) used by the server (4) to command the operation of the measurement instrumentation (1). The measurement instrumentation (1) obtains measurements and traces of the measured signals and sends them back to the Instrumentation Command and Control Module (14) and through the Wireless Communications Control Module (13) are sent from the server (4) back to the Control Module (17a) of the handheld computer (6a), in which the measurements and data traces are processed through the different modules already described.

The invention in both implementation examples covers the possibility of multiple users accessing the server (4) simultaneously; for that purpose, the Wireless Communications Control Module (13) has a Multitasking Control sub-module (18), and the Command Editing & Control Module (9, 9a) of the wireless handheld mobile terminal (6, 6a) has a shared instrumentation Coordination sub-module (19).

The Multitasking Control sub-module (18) includes multi-thread support that allows different execution links to support a timesharing scheme on the measurement instrumentation, where the Multitasking Control sub-module (18) is the one that controls the active session, the command execution order and the active users in order to provide them concurrent access to the measurement instrumentation.

This scheme assures that operations performed by different concurrent users on the same measurement instrumentation (1) are independent from each other, so the measurement instrumentation is shared transparently among multiple wireless handheld mobile terminal users in real-time.

The Instrumentation Command & Control Module (14) of the server (4) allows performing the remote control of different commercially available measurement instrumentation (1) brands and models in the market through command specialization.

On top of that, the Instrumentation Command & Control Module (14) includes error control mechanisms for managing different critical scenarios as, for instance, power mains failures, network disconnection, rejections and others, that results on an extraordinary help to avoid error situations and the lack of the system control.

Also, the Command Editing & Control Module (9, 9a) of the wireless handheld mobile terminal (6, 6a), together with the Instrumentation Command Control Module (14) of the server (4), allows performing the carrier signal alignment, as it is conventionally done, but with the difference that in this case it is commanded from a remote wireless handheld mobile terminal (6, 6a). The alignment process is performed to avoid undesired effects on the carrier signals in the system by means of measurement and adjustment of Carrier Amplitude Level, Carrier Center Frequency, Carrier Bandwidth, Carrier Power, Carrier to Noise Ratio and Carrier Cross-Polarization Isolation; all these measurements are made by the invented system.

What is claimed is:

1. Satellite and Terrestrial Remote Monitoring System from Wireless Handheld Mobile Terminals, which comprises at least a signal capture element, a measurement instrument, for obtaining data traces representing those satellite and terrestrial signals, a server which commands the measurement instrument to obtain and process the measurement results and data traces provided by that measurement instrument, one or more wireless handheld mobile terminals comprising:
    a control module to command the measurement instrument in order to obtain measurement results and traces from the wireless handheld mobile terminal through the server and also to control the reception of measurement data and traces, obtained by the measurement instrument, at the wireless handheld mobile terminal;
    a command editing and control module for the selective edition of commands and its transmission to the measurement instrument through the server;
    a graphics module for displaying in real time on the wireless handheld mobile terminal graphics screen the measurements results and traces obtained from the measurement instrumentation on the handheld screen, said screen being connected to the handheld computer non-volatile memory to store different traces obtained by the measurement instrumentation and record the spectrum activity during a given time period, the graphics module further comprising a processing sub-module to process and display in real-time several traces simultaneously, including any cross-polarization isolation measurement graphics representations, stemming from two signals from two different polarizations that may be displayed simultaneously, and a sub-module to zoom-in the represented traces and a sub-module to display, in real time, the maximum hold and minimum hold traces during a given time period; the server further incorporating:
    a wireless communication control module for communicating with the wireless handheld mobile terminals and comprising a multitasking sub-module for providing concurrent access to multiple simultaneous users;
    a storage module which includes a user identification and authentication sub-module to perform its validation, once the communication has been established, allowing the access to the measurement instrumentation;
    an instrumentation command control module for managing the commands received from the wireless handheld mobile terminal to command the measurement instrumentation, allowing its control, and comprising a shared instrumentation coordination sub-module to share the measurement instrumentation transparently among multiple wireless handheld mobile terminal users in real-time; and
    a data base which stores that data that allows to remotely control the measurement instrumentation form the wireless handheld mobile terminals.

2. Satellite and Terrestrial Remote Monitoring System from Wireless Handheld Mobile Terminals, according to claim 1 wherein the wireless handheld mobile terminal is determined by a cellular mobile telephone terminal that also comprises a dial-up connection module for establishing the call to communicate the cellular mobile telephone terminal with the server, and a math processor to format and display the raw measurement results and trace information received, and a measurement set-up edit, save and recall module.

3. Satellite and Terrestrial Remote Monitoring System from Wireless Handheld Mobile Terminals, according to claim 1 wherein the wireless handheld mobile terminal is determined by a handheld computer with an integrated wireless local area network (WLAN) transceiver, also known as Wi-Fi (IEEE-802.11 standard), also named pocket computer, pocket PC or PDA (Personal Device Assistant), which also comprises:
    an instrumentation measurement set-up editing and save and recall module connected to the handheld computer non-volatile memory to save different measurement instrumentation set-ups and, afterwards, recall any pre-saved set-up and end it to the measurement instrumentation through the server to configure the measurement instrumentation with that selected operating set-up; this instrumentation measurement set-up editing and save and recall module comprising a measurement trace limit mask sub-module to graphically indicate where and when the measurement results are above and/or below the defined upper and lower measurement limits, upper and lower, establish gap or margin; and, also, defining relative upper and lower limits taking any single point of the measured trace as a reference;
    a command editing and control module to facilitate the selective edition of commands that are sent to the measurement instrument through he server, that comprises:
        a frequency sub-module to set the frequency parameters a the measurement instrument (start, stop, center, span, offset);
        a markers sub-module to position and display markers at the displayed trace and its associated measurement readouts: frequency and amplitude;
        a filters sub-module to select different video and resolution filter bandwidths at the measurement instrumentation, and to specify the trace average factor and the sweep time parameter;
        an amplitude sub-module to set the amplitude parameters at the measurement instrument (reference level, scale, input attenuation);
        a display selection sub-module to establish a selection of different traces to be displayed on the handheld computer screen;
        a measurement sub-module to specify one or multiple measurements (signal center frequency, amplitude, bandwidth, power, C/N ratio, cross-pol isolation) on the displayed trace at the handheld computer screen; and a measurement parameter sub-module to specify or select the measurement parameter value to be used by processing algorithms applied to raw measurements readings in order to compute elaborated results of previously mentioned measurements.

4. Satellite and Terrestrial Remote Monitoring System from Wireless Handheld Mobile Terminals, according to claim 2, wherein the cellular mobile telephone terminal is integrated into a handheld or laptop computer, using its screen to display traces and measurement results.

5. Satellite and Terrestrial Remote Monitoring System from Wireless Handheld Mobile Terminals, according to claim 2, wherein the server is connected to the cellular mobile telephone network.

6. Satellite and Terrestrial Remote Monitoring System from Wireless Handheld Mobile Terminals, according to claim 3, wherein a solid-state or electromechanical switching matrix is inserted between multiple possible signal capture elements and the measurement instrumentation and wherein the command editing and control module in the handheld computer comprises a switching module that allows the selection of a particular input signal from those coming from the signal capture elements for performing its measurements through the server and, in particular, the orthogonal polarized vertical and horizontal inputs that allows the automation of the cross-polarization isolation measurement by alternating, in a measurement instrument sweep synchronized way, the input switching selection at the switching matrix between these two orthogonal polarized input signals (i.e. vertical and horizontal polarized signals).

7. Satellite and Terrestrial Remote Monitoring System from Wireless Handheld Mobile Terminals, according to claim 3, wherein the frequency sub-module comprises a block for selection or value definition for each of the measurement instrumentation frequency analysis parameters:
   center frequency;
   frequency spans;
   start frequency;
   stop frequency; and
   center frequency.

8. Satellite and Terrestrial Remote Monitoring System from Wireless Handheld Mobile Terminals, according to claim 3, wherein the markers sub-module comprises:
   a block with marker search functions to position the markers at the maximum or minimum amplitude point in a given trace being displayed on the handheld computer screen;
   a block to set the analyzer's center frequency to the frequency value indicated by the marker readout;
   a block to set the analyzer's amplitude reference level to the amplitude value indicated by the marker readout; and
   a block delta marker to indicate the frequency and amplitude difference between two markers readouts.

9. Satellite and Terrestrial Remote Monitoring System from Wireless Handheld Mobile Terminals, according to claim 3, wherein the amplitude sub-module comprises a block for selection or value definition for each of the measurement instrumentation following amplitude parameters:
   reference level;
   amplitude scale; and
   input attenuation.

10. Satellite and Terrestrial Remote Monitoring System from Wireless Handheld Mobile Terminals, according to claim 3, wherein the filters sub-module includes a block for selection or value definition for each measurement instrumentation following filtering parameters:
    video filter bandwidth; and
    resolution or IF filter bandwidth
    said filters sub-module further comprising blocks for selection or value definition of the measurement instrumentation frequency sweep time and trace averaging factor.

11. Satellite and Terrestrial Remote Monitoring System from Wireless Handheld Mobile Terminals, according to claim 3, wherein the measurement sub-module to specify one or multiple measurements; signal center frequency, amplitude, bandwidth, power, C/N ratio and cross-pol isolation on the displayed trace at the handheld computer screen comprises:
    a block to selectively command the execution of each measurement ir, a single or continuous way.

12. Satellite and Terrestrial Remote Monitoring System from Wireless Handheld Mobile Terminals, according to claim 3, wherein the measurement parameters sub-module used to specify or select the measurement parameter values to be used by processing algorithms applied to raw measurements readings in order to compute elaborated results of previously mentioned measurements includes:
    a block for signal modulation format selection: analog or digital, used for computation of the power measurement;
    a block for definition of reference frequency bandwidth for the normalization of the noise measurement result used in the calculation of the C/N ratio measurement;
    a block for definition of signal center frequency offset to perform the noise measurement used in the calculation of the C/N ratio measurement;
    a block for definition of amplitude offset in dB from maximum amplitude point of signal's trace to perform the signal bandwidth measurement; and
    a block for selection of input switching position of the cross polarized signal to perform the cross-polarization isolation measurement.

13. Satellite and Terrestrial Remote Monitoring System from Wireless Handheld Mobile Terminals, according to claim 3, wherein the display selection sub-module to establish a selection of different traces to be displayed on the handheld computer screen comprises:
    a block for zooming in the represented traces on the screen;
    a block for defining the storage place in the handheld computer memory for measurement traces;
    a block for editing the measurement results with an external standard word processor; and
    a block for printing the measurement results and traces on a printer connected to the handheld computer.

14. Satellite and Terrestrial Remote Monitoring System from Wireless Handheld Mobile Terminals, according to claim 3, wherein the handheld computer non-volatile memory stores, by default, the instrumentation preset set-up.

15. Satellite and Terrestrial Remote Monitoring System from Wireless Handheld Mobile Terminals, according to claims 1, 2 or 3, wherein the server is connected to the Internet Network.

* * * * *